US007791349B2

(12) United States Patent
Kato

(10) Patent No.: US 7,791,349 B2
(45) Date of Patent: Sep. 7, 2010

(54) FUEL CELL DIAGNOSTIC APPARATUS AND DIAGNOSTIC METHOD

(75) Inventor: Chisato Kato, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 155 days.

(21) Appl. No.: 11/819,076

(22) Filed: Jun. 25, 2007

(65) Prior Publication Data
US 2008/0042654 A1 Feb. 21, 2008

(30) Foreign Application Priority Data
Jun. 30, 2006 (JP) ............................. 2006-181992

(51) Int. Cl.
*G01N 27/416* (2006.01)
*G01N 27/42* (2006.01)
(52) U.S. Cl. ....................................... 324/426; 324/425
(58) Field of Classification Search ................ 324/425, 324/228, 260, 426, 432; 320/132, 134, 136; 429/90, 10, 12
See application file for complete search history.

(56) References Cited
U.S. PATENT DOCUMENTS

| 4,598,243 | A | * | 7/1986 | Kawakami | 323/349 |
| 4,947,123 | A | * | 8/1990 | Minezawa | 324/427 |
| 5,412,323 | A | * | 5/1995 | Kato et al. | 324/429 |
| 6,709,779 | B2 | * | 3/2004 | Uozumi | 429/24 |
| 7,514,166 | B2 | * | 4/2009 | Hickey et al. | 429/13 |
| 7,569,295 | B2 | * | 8/2009 | Ninomiya et al. | 429/23 |
| 2001/0035756 | A1 | * | 11/2001 | Kozlowski | 324/426 |
| 2004/0137292 | A1 | * | 7/2004 | Takebe et al. | 429/23 |
| 2005/0053814 | A1 | * | 3/2005 | Imamura et al. | 429/22 |
| 2005/0260471 | A1 | | 11/2005 | Logan et al. | |

FOREIGN PATENT DOCUMENTS

| JP | 60155985 | A | * | 8/1985 |
| JP | 08222260 | A | * | 8/1996 |
| JP | 10-216461 | A | | 8/1998 |
| JP | 2004-500689 | A | | 1/2004 |
| JP | 2004-127901 | A | | 4/2004 |
| JP | 2004-172105 | A | | 6/2004 |
| JP | 2004-172106 | A | | 6/2004 |
| JP | 2005-123162 | A | | 5/2005 |
| JP | 2005-141936 | A | | 6/2005 |

(Continued)

OTHER PUBLICATIONS

Machine English Translation of JP 2007-115512 A.*

*Primary Examiner*—Hoai-An D Nguyen
(74) *Attorney, Agent, or Firm*—Kenyon & Kenyon LLP

(57) ABSTRACT

A fuel cell diagnostic apparatus that diagnoses a fuel cell in which a plurality of power generating cells are stacked together includes a voltage applying device that applies voltage from outside of the fuel cell; a magnetic field measuring device that measures a magnetic field in or around the fuel cell when external voltage is being applied; and a diagnostic device that diagnoses the state of the fuel cell from the measurement results of the magnetic field. By diagnosing an in-plane distribution of current in the power generating cells by measuring the magnetic field, the distribution of water in an electrolyte membrane after power is generated can be diagnosed based on the diagnostic results of that in-plane distribution of the current.

13 Claims, 5 Drawing Sheets

FOREIGN PATENT DOCUMENTS

| | | |
|---|---|---|
| JP | 2005-149933 A | 6/2005 |
| JP | 2005-188959 A | 7/2005 |
| JP | 2005-345249 A | 12/2005 |
| JP | 2006329642 A * | 12/2006 |
| JP | 2007115512 A * | 5/2007 |

* cited by examiner

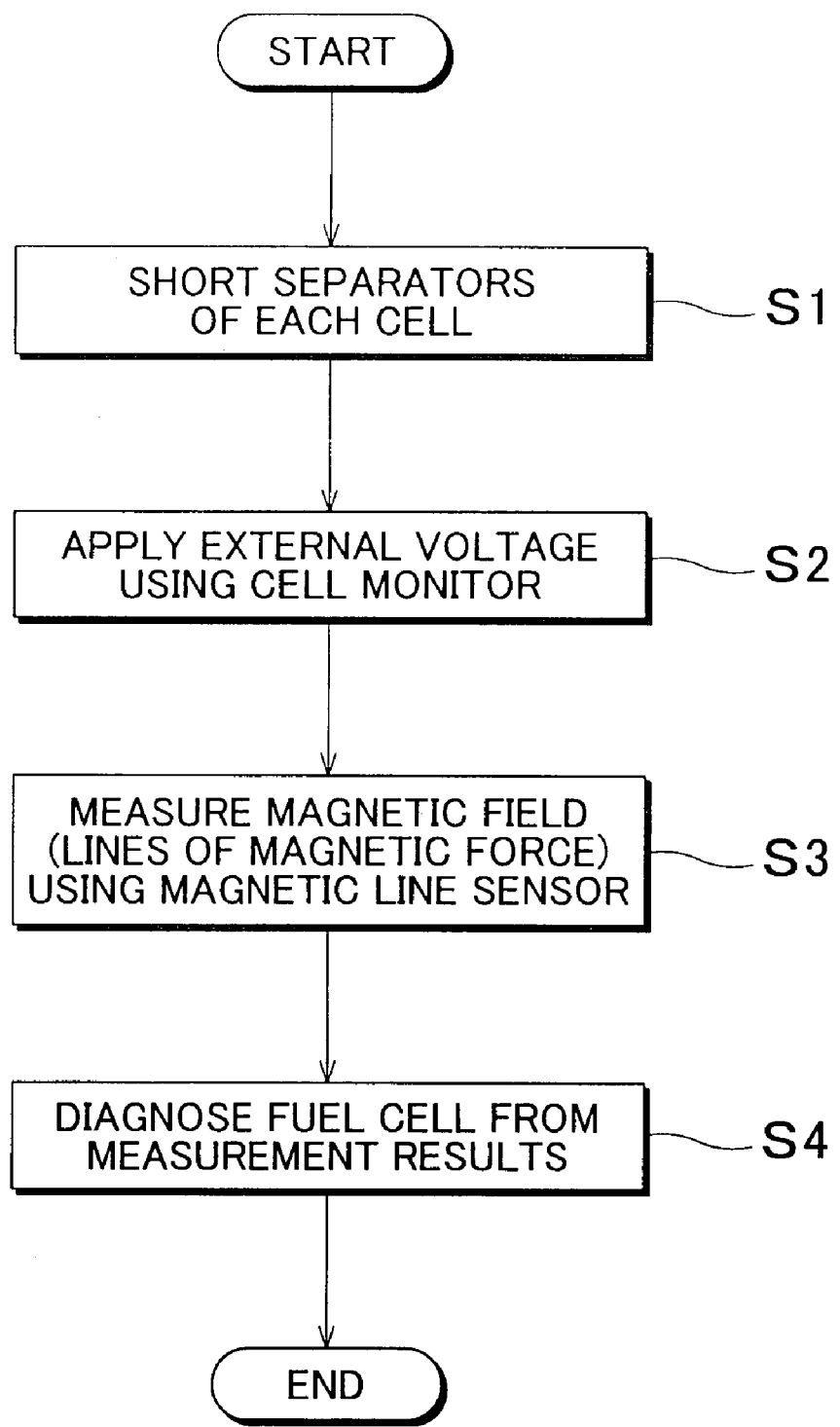

FUEL CELL DIAGNOSTIC APPARATUS AND DIAGNOSTIC METHOD

INCORPORATION BY REFERENCE

The disclosure of Japanese Patent Application No. 2006-181992 filed on Jun. 30, 2006, including the specification, drawings and abstract is incorporated herein by reference in its entirety.

BACKGROUND OF THE INVENTION

1. Field of the Invention

The invention relates to a fuel cell diagnostic apparatus and diagnostic method. More particularly, the invention relates to an improvement in technology for diagnosing whether there is an abnormality in a fuel cell.

2. Description of the Related Art

A fuel cell (such as a polymer electrolyte fuel cell) is typically made by stacking together a plurality of cells (power generating cells) each having an electrolyte sandwiched between separators. Conventionally, in one such fuel cell formed of these cell stack bodies, a cell monitor is provided to measure the voltage of the cell (i.e., the cell voltage) so that the power generating status such as the fluctuation in cell voltage while power is being generated in the fuel cell can be monitored. More specifically, technology is described that enables the current distribution while power is being generated in the fuel cell to be detected by a magnetic sensor provided in the cell, for example (see Japanese Patent Application Publication No. JP-A-2005-123162, for example).

However, even if there is a measure to detect the current distribution while power is being generated in the fuel cell, as described above, there is no measure to diagnose the distribution of water in an electrolyte membrane when power is not being generated in the fuel cell.

SUMMARY OF THE INVENTION

This invention thus provides a fuel cell diagnostic apparatus and diagnostic method capable of diagnosing the distribution of water in an electrolyte membrane when power is not being generated in a fuel cell.

Various technologies exist for monitoring the status of a fuel cell while the fuel cell is generating power, some of which monitor fluctuations in cell voltage using a cell monitor (voltage sensor), as described above, and others which monitor the power generating distribution using a magnetic line sensor provided on an outer peripheral portion of a fuel cell stack. The former voltage sensor is not able to measure the in-plane power generating distribution of an electrode because it monitors the average voltage of the entire cell so if an abnormality occurs in a portion of the cells, it may not be able to be detected. With respect to this, with a voltage sensor, even if an abnormality occurs (i.e., even if the current density decreases) in an in-plane portion of the cells, it is often compensated for by the other portions that are functioning normally (i.e., the current density increases). As a result, the average cell voltage is not abnormal so an abnormality in which there is a localized problem may go undetected.

On the other hand, the latter magnetic line sensor can measure the power generating (current density) distribution of the entire fuel cell stack without contact. Therefore, even if a cell with a power generating distribution different from the power generating distribution of another cell is stacked in the stack, it is possible to detect whether there is an abnormal cell using the distortion produced in the lines of magnetic force that extend through the stack. Because the power of the magnetic line sensor to detect an abnormal cell is low, however, it is possible that a cell adjacent to the abnormal cell may be erroneously detected as being abnormal. In minor cases, the abnormality may not be able to be detected at all. With respect to this, when there is an abnormality in a given cell, for example, that abnormality affects the power generating distribution of adjacent cells so even if a cell itself is functioning normally, its power generating distribution is different that it is normally. As a result, an adjacent normal cell may end up being erroneously detected as abnormal. Also, conversely, when the abnormality is minor, it may not be able to be detected because it may be compensated for by the power generating distribution of adjacent normal cells which reduces the change in the lines of magnetic force. Moreover, because this method detects an abnormality based on the power generating distribution of the entire stack and not by cell, it is not able to sufficiently identify an abnormal cell.

From this, it is possible that, because output is obtained with all of the sensors when power is being generated in the fuel cell, a sort of reversible abnormality or a state during a transient change, such as a temporary change in the power generating distribution from, for example, accumulation of produced water in a certain area, or a transitional difference in the power generating state of each cell during a change in the load, may be erroneously detected as an abnormality of a cell.

A first aspect of the invention relates to a fuel cell diagnostic apparatus that diagnoses a fuel cell in which a plurality of power generating cells are stacked together, which includes a voltage applying device that applies voltage from outside of the fuel cell; a magnetic field measuring device that measures a magnetic field in or around the fuel cell when external voltage is being applied; and a diagnostic device that diagnoses the state of the fuel cell from the measurement results of the magnetic field.

In this first aspect, a magnetic field (lines of magnetic force) is generated in or around the fuel cell by applying external voltage when power is not being generated in the fuel cell, at which time there is no effect from the transitional change that occurs when power is being generated, for example. When there is an abnormal cell in the fuel cell stack, the magnetic field (lines of magnetic force) is affected by it and becomes distorted. As a result, the presence of an abnormal cell can be detected by measuring the distortion in the magnetic field (lines of magnetic force), thereby enabling the fuel cell to be diagnosed.

Also, if a large amount of water produced in the cell disturbs the flow or diffusion of reaction gas, for example, electrolysis of water occurs at the portion where a large amount of that water is present which results in a current distribution that is different from the current distribution in other portions. Or, if a catalyst in an MEA (Membrane Electrode Assembly) is degraded, for example, current is not able to flow easily through that portion so the current distribution ends up being different than the current distribution at other portions. According to the first aspect, the magnetic field that has been affected and distorted as a result can be measured, and the location where the current distribution is different can also be detected based on the measurement results. Accordingly, the in-plane distribution of current in the power generating cell can be diagnosed based on those detection results, and further, the distribution of water in the electrolyte membrane after power is generated can be diagnosed based on those results.

In the foregoing fuel cell diagnostic apparatus, the voltage applying device may generate a magnetic field in or around the fuel cell by applying external voltage from a cell monitor that measures the power generating status of the fuel cell by measuring the cell voltage of the power generating cells. In this case, a fuel cell is used which is provided in advance with a cell monitor for measuring the power generating status of the fuel cell, and this existing cell monitor is also used as a device that applies voltage externally, i.e., as an external voltage supply device. In addition, depending on the structure a cell monitor may be provided for each of the plurality of stacked power generating cells. In this case, a magnetic field can be generated for each cell by applying voltage to each cell so the location of an abnormality can be identified more precisely. Of course in this case, other external equipment for applying voltage is not necessary.

Also in the first aspect, the diagnostic device may diagnose an in-plane distribution of current in the power generating cells. Accordingly, the distribution of water in an electrolyte membrane of the fuel cell while the fuel cell is not generating power can be diagnosed based on the diagnostic results of the in-plane distribution of current in the power generating cells.

Furthermore, the voltage applying device may apply external voltage to the fuel cell while separators of the plurality of power generating cells are shorted. Typically, as power continues to be generated in the fuel cell, oxides accumulate on the surface of the electrode catalyst, which interferes with contact between the reaction gas and the electrode catalyst. As a result, the power generating performance (output) gradually declines. On the other hand, if the separators are shorted while fuel gas is present in the cells, the reduction reaction of the oxides cleans and reactivates the catalyst surface, thereby restoring power generating performance. When a magnetic field (lines of magnetic force) is generated in the cells by applying voltage externally to the fuel cell while the separators of the plurality of power generating cells are shorted, a reduction reaction similar to that described above is induced, thus making it possible to reactivate the catalyst surface at the same time an abnormality detection is performed with respect to the cells.

A second aspect of the invention relates to a fuel cell diagnostic method for a fuel cell in which a plurality of power generating cells are stacked together, which includes the steps of applying voltage from outside of the fuel cell; measuring a magnetic field in or around the fuel cell when external voltage is being applied; and diagnosing the state of the fuel cell from the measurement results of the magnetic field.

Also, in the second aspect, external voltage may be applied to the fuel cell from a cell monitor that measures the power generating status of the fuel cell by measuring the cell voltage of the power generating cells.

In this case, external voltage may be applied to the fuel cell while separators of the plurality of power generating cells are shorted.

A third aspect of the invention relates to a fuel cell diagnostic apparatus that diagnoses a fuel cell in which a plurality of power generating cells are stacked together, which includes voltage applying means for applying voltage from outside of the fuel cell; magnetic field measuring means for measuring a magnetic field in or around the fuel cell when external voltage is being applied; and diagnosing means for diagnosing the state of the fuel cell from the measurement results of the magnetic field.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5 is a flowchart illustrating one example of a routine of the fuel cell diagnostic method.

DETAILED DESCRIPTION OF THE PREFERRED EMBODIMENTS

In the following description and the accompanying drawings, the present invention will be described in more detail in terms of example embodiments.

FIGS. 1 to 5 show example embodiments of a fuel cell diagnostic apparatus and a diagnostic method according to the invention. The fuel cell diagnostic apparatus 50 of the invention is a diagnostic apparatus for diagnosing a fuel cell 1 formed of a plurality of power generating cells (hereinafter also simply referred to as "cells") 2. In this example embodiment, a magnetic field in or around the fuel cell 1 when external voltage is being applied is measured and the state of the fuel cell 1 is diagnosed from those measurement results.

In the example embodiment described below, first the general structure of the cells 2 that make up the fuel cell 1, as well as the general structure of a cell stack body 3 that is formed of a plurality of stacked cells 2 will be described. Then the structure for applying external voltage and diagnosing the state of the fuel cell 1 will be described.

Figure 1:
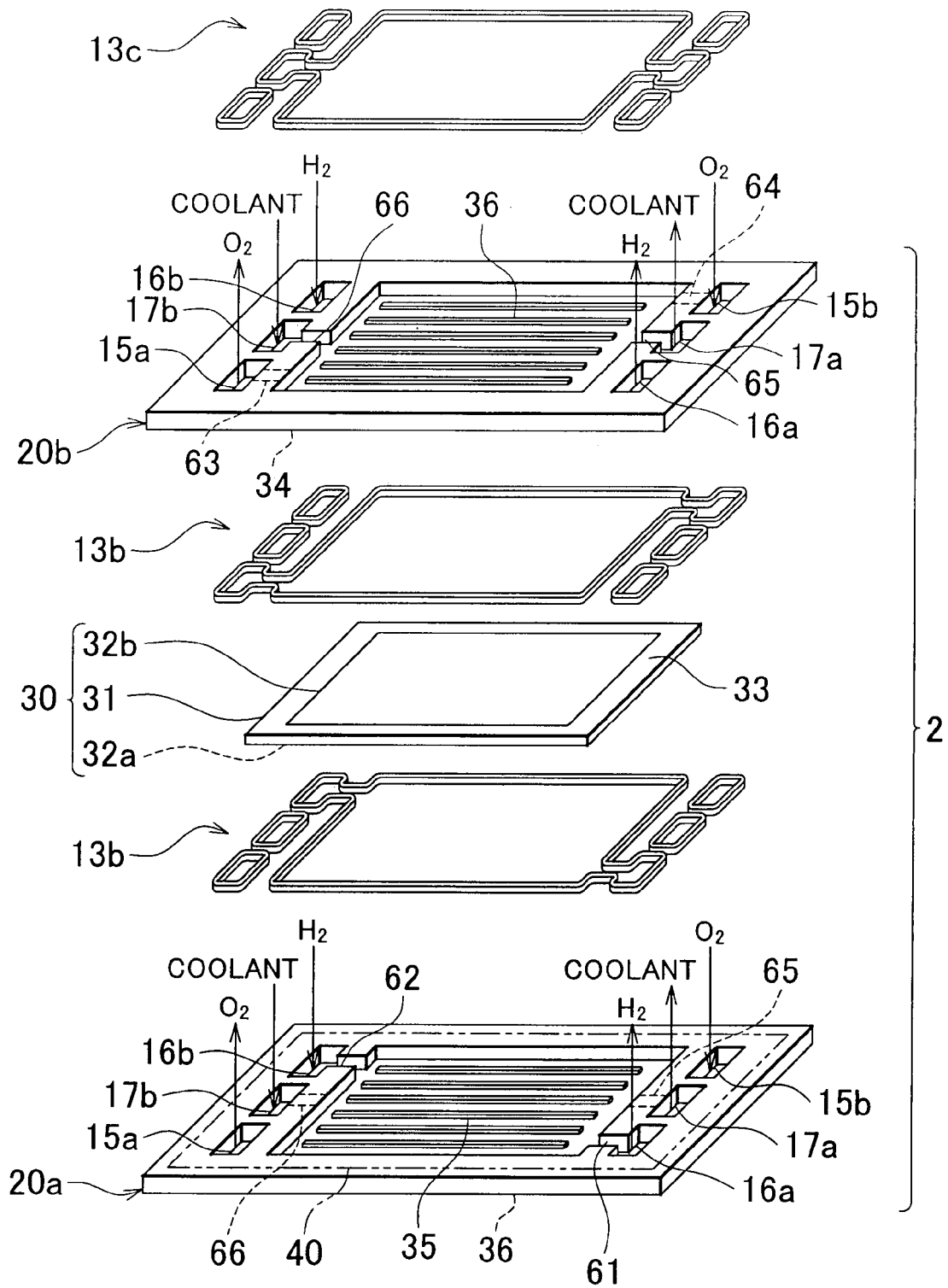
FIG. 1 is an exploded perspective view of an example structure of a power generating cell that forms a fuel cell.

FIG. 1 is a schematic view of the general structure of one of the cells 2 of the fuel cell 1 in this example embodiment. A plurality of the cells 2 structured as shown in the drawing are stacked together in series to form a cell stack body 3 (see FIG. 2). Also, the fuel cell stack formed by this cell stack body 3 and the like is then bound with a load applied in the stacking direction while, for example, both ends of the stack are sandwiched between a pair of end plates 8 and restraining members formed of tension plates 9 are then arranged in such a way as to fasten these end plates 8 together (see FIG. 2).

Incidentally, the fuel cell 1 formed by such a fuel cell stack and the like can be used as an on-board power generating system of a fuel cell vehicle (FCHV: Fuel Cell Hybrid Vehicle), for example, but is not limited to this. That is, the fuel cell 1 can also be used as a power generating system mounted in, for example, various types of mobile bodies (such as marine vessels and airplanes) or an automatable body such as a robot or the like, and can also be used as a stationary power generating system.

The cell 2 includes an electrolyte (a specific example of which is a membrane electrode assembly, hereinafter referred to as "MEA") 30, and a pair of separators 20 (indicated by reference characters 20a and 20b in FIG. 1) that sandwich the MEA 30, and the like (see FIG. 1). The MEA 30 and the separators 20a and 20b are each formed in a generally rectangular plate shape. Also, the MEA 30 is formed so that the outer shape thereof is smaller than the outer shapes of the separators 20a and 20b.

The MEA 30 includes a polymer electrolyte membrane made of an ion-exchange membrane of polymer material (hereinafter also simply referred to as "electrolyte membrane") 31, and a pair of electrodes (an anode side diffusion electrode and a cathode side diffusion electrode) 32a and 32b that sandwich the electrolyte membrane 31 from both sides (see FIG. 1). The electrolyte membrane 31 is formed larger than the electrodes 32a and 32b. The electrodes 32a and 32b are joined by a hot press method, for example, to the electrolyte membrane 31 in positions such that the peripheral edge portions 33 of the electrolyte membrane 31 are left uncovered.

The electrolytes 32a and 32b that make up part of the MEA 30 are formed of porous carbon material (diffusion layers), for example, that carry a catalyst such as platinum adhered to the surface. Hydrogen gas is supplied as a fuel gas (a reaction gas) to one of the electrodes (the anode) 32a while oxidizing gas (a reaction gas) such as air or an oxidizing agent is supplied to the other electrode (the cathode) 32b. Electromotive force is then generated in the cell 2 by the electrochemical reaction that takes place between these two types of reaction gases in the MEA 30.

The separators 20 (20a and 20b) are formed of gas impermeable conductive material such as carbon, hard conductive resin, or a metal such as aluminum or stainless steel. The substrates of the separators 20 (20a and 20b) in this example embodiment are formed of plate-shaped metal (i.e., a metal separator), and a highly corrosion resistant membrane (such as a membrane formed of gold plating) is formed on the surfaces of these substrates that are nearest the electrodes 32a and 32b.

Also, groove-shaped flow paths formed by a plurality of concave portions are formed on both sides of the separators 20a and 20b. These flow paths can be formed by press forming in the case of the separators 20a and 20b of this example embodiment in which the substrates are formed of plate-shaped metal, for example. The groove-shaped flow paths formed in this way form a gas flow path 34 for the oxidizing gas, a gas flow path 35 for the hydrogen gas, or a so-called coolant flow path 36. More specifically, a plurality of the gas flow paths 35 for hydrogen gas are formed on the inside surface, i.e., on the side nearest the electrode 32a, of the separator 20a, while a plurality of the coolant flow paths 36 are formed on the back side (i.e., on the outside surface) of that separator 20a (see FIG. 1). Similarly, a plurality of the gas flow paths 34 for oxidizing gas are formed on the inside surface, i.e., on the side nearest the electrode 32b, of the separator 20b, while a plurality of the coolant flow paths 36 are formed on the back side (i.e., on the outside surface) of that separator 20b (see FIG. 1). For example, in this example embodiment, the structure is such that with two adjacent cells 2, both of the coolant flow paths 36 when the outside surface of the separator 20a of one cell 2 is matched up with the outside surface of the separator 20b of the adjacent cell 2 come together to form a single coolant flow path 36 having a cross section that is rectangular or honeycomb-shaped, for example.

Further, as described above, the separators 20a and 20b are such that at least the concave and convex shapes for forming the fluid flow paths are reversed on the front and back surfaces. More specifically, with the separator 20a, the back surface of the convex shape (convex rib) that forms the gas flow path 35 for the hydrogen gas serves as the concave shape (concave groove) that forms the coolant flow path 36, and the back surface of the concave shape (concave groove) that forms the gas flow path 35 serves as the convex shape (convex rib) that forms the coolant flow path 36. Moreover, with the separator 20b, the back surface of the convex shape (convex rib) that forms the gas flow path 34 for the oxidizing gas serves as the concave shape (concave groove) that forms the coolant flow path 36, and the back surface of the concave shape (concave groove) that forms the gas flow path 34 serves as the convex shape (convex rib) that forms the coolant flow path 36.

Also, an oxidizing gas inlet side manifold 15a, a hydrogen gas outlet side manifold 16b, and a coolant outlet side manifold 17b are formed near the end portion in the lengthwise direction of the separators 20a and 20b (i.e., near the one end portion shown on the left side in FIG. 1 in the case of this example embodiment). In this example embodiment, for example, these manifolds 15a, 16b, and 17b are formed by generally rectangular or trapezoidal holes formed in the separators 20a and 20b (see FIG. 1). Furthermore, an oxidizing gas outlet side manifold 15b, a hydrogen gas inlet side manifold 16a, and a coolant inlet side manifold 17a are formed at the end portion on the side of the separators 20a and 20b opposite the manifolds 15a, 16b, and 17b. In this example embodiment, these manifolds 15b, 16a, and 17a are also formed by generally rectangular or trapezoidal holes (see FIG. 1). Incidentally, in FIG. 2 and the like, the reference characters of the manifolds are shown without letters a and b appended.

Of the manifolds described above, the hydrogen gas inlet side manifold 16a and outlet side manifold 16b of the separator 20a are open to the gas flow path 35 for the hydrogen gas via an inlet side connecting passage 61 and an outlet side connecting passage 62, respectively, which are formed in groove-shapes in the separator 20a. Similarly, the oxidizing gas inlet side manifold 15a and outlet side manifold 15b of the separator 20b are open to the gas flow path 34 for the oxidizing gas via an inlet side connecting passage 63 and an outlet side connecting passage 64, respectively, which are formed in groove-shapes in the separator 20b (see FIG. 1). Moreover, the coolant inlet side manifold 17a and outlet side manifold 17b of the separators 20a and 20b are open to the coolant flow path 36 via an inlet side connecting passage 65 and an outlet side connecting passage 66, respectively, which are formed in groove-shapes in the separators 20a and 20b. The structure of the separators 20a and 20b described thus far enables oxidizing gas, hydrogen gas, and coolant to be supplied to the cell 2. A specific example will now be given. When the cells 2 are stacked, hydrogen gas, for example, flows from the inlet side manifold 16a of the separator 20a into the gas flow path 35 through the connecting passage 61. After serving to generate power in the MEA 30, the hydrogen gas then flows through the connecting passage 62 and out through the outlet side manifold 16b.

A first seal member 13a and a second seal member 13b are both formed of a plurality of members (such as four small rectangular frame bodies and a large frame body that forms a fluid flow path) (see FIG. 1). Of these, the first seal member 13a is provided between the MEA 30 and the separator 20a. More specifically, the first seal member 13a is provided so that a portion thereof is interposed between the peripheral edge portion 33 of the electrolyte member 31 and a portion of the separator 20a that surrounds the gas flow path 35. Also, the second seal member 13b is provided between the MEA 30 and the separator 20b. More specifically, the second seal member 13b is provided so that a portion thereof is interposed between the peripheral edge portion 33 of the electrolyte member 31 and a portion of the separator 20b that surrounds the gas flow path 34.

Moreover, a third seal member 13c which is formed of a plurality of members (such as four small rectangular frame bodies and a large frame body that forms a fluid flow path) is provided between the separator 20a and the separator 20b of adjacent cells 2 (see FIG. 1). This third seal member 13c is provided interposed between a portion of the separator 20b around the coolant flow path 36 and a portion of the separator 20a around the coolant path 36, providing a seal therebetween.

The first to the third seal members 13a to 13c may each be made of an elastic body (a gasket) that seals in fluid by physically contacting the adjacent member, or of an adhesive or the like that adheres by a chemical bond with the adjacent member. In this example embodiment, for example, each of the seal members 13a to 13c is a member that provides a physical seal using elasticity. Alternatively, however, each member 13a to 13c may also be a member that provides a seal by a chemical bond, such as an adhesive described above.

A frame-shaped member 40 is a member that is made of resin, for example, and sandwiched, together with the MEA 30, between the separators 20a and 20b (hereinafter this frame-shaped member may also be referred to as a "resin frame"). In this example embodiment, for example, the resin frame 40 which has a thin frame shape is interposed between the separators 20a and 20b and sandwiches at least a portion, such as the portion along the peripheral edge portion 33, of the MEA 30 from the front and back sides. The resin frame 40 provided in this manner thus functions 1) as a spacer between the separators 20 (20a and 20b) that supports the clamping force, 2) as an insulating member, and 3) as a stiffening member that reinforces the rigidity of the separators 20 (20a and 20b).

Figure 2:
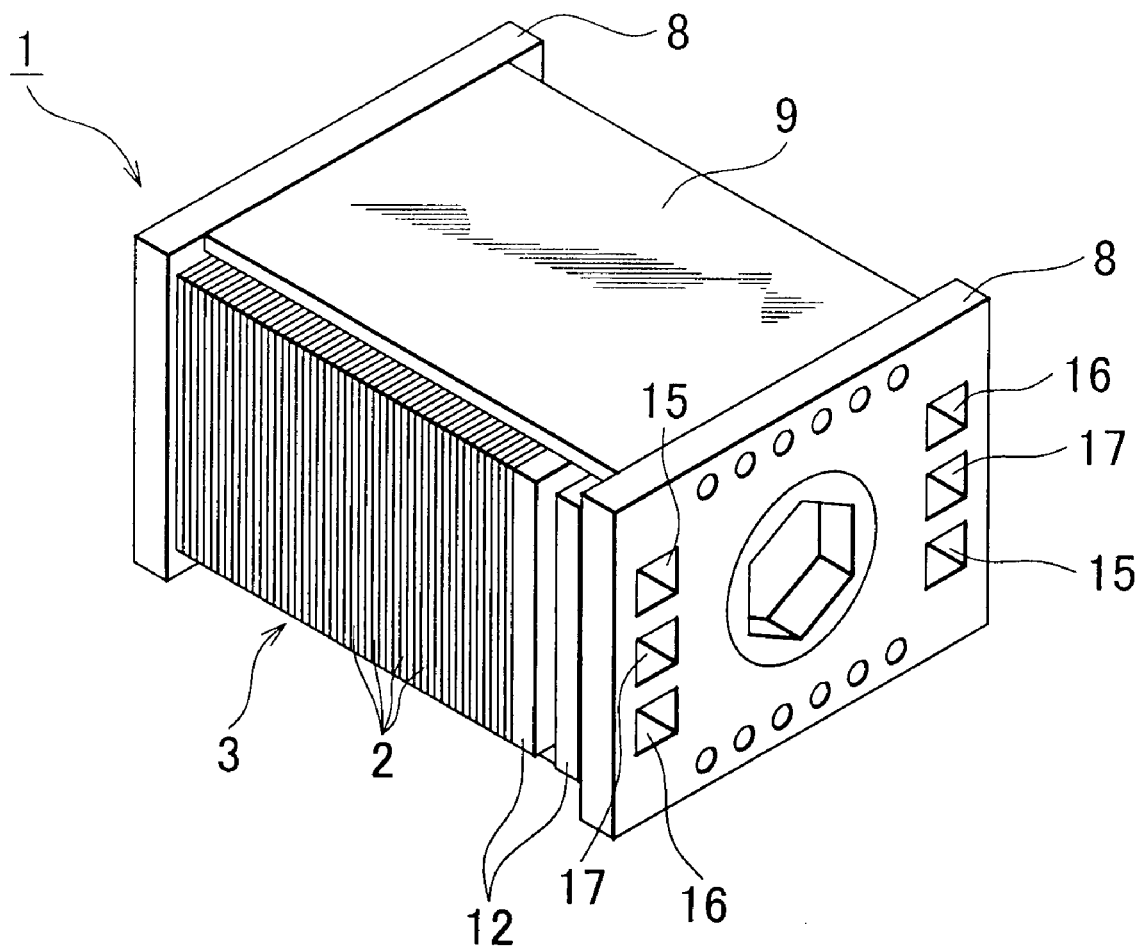
FIG. 2 is a perspective view schematically showing an example structure of a fuel cell stack.

Next, a simple description of the structure of the fuel cell 1 will be given (see FIG. 2). The fuel cell 1 in this example embodiment includes the cell stack body 3 in which a plurality of the cells 2 are stacked together. A collector plate with an output terminal, an insulating plate, and an end plate 8 are then each arranged in order on the outsides of the cells 2 that are positioned at both ends of the cell stack body 3 (see FIG. 2). Further, tension plates 9 that bind the cell stack body 3 and the like in a stacked state are provided spanning between the end plates 8, e.g., a pair of the tension plates 9 is arranged facing both sides of the stack (see FIG. 2). The tension plates 9 are connected to the end plates 8, keeping a predetermined clamping force (i.e., compression load) applied in the stacking direction of the cell stack body 3. Further, an insulating film, not shown, for preventing electrical leakage and sparking is formed on the inside surface (i.e., the surface facing the cell stack body 3) of the tension plates 9. This insulating film is formed, for example, with insulating tape adhered to the inside surface of the tension plates 9 or a resin coating applied to cover the surface, or the like. Incidentally, a pair of plate-shaped members 12 sandwich an elastic module formed of a coil spring, for example, that applies clamping force (i.e., a compression load) to the fuel cell stack (see FIG. 2).

Continuing on, a fuel cell diagnostic apparatus 50 for diagnosing the state of the fuel cell 1 by applying external voltage, as well as a diagnostic method using this fuel cell diagnostic apparatus 50 will now be described (see FIGS. 3 to 5).

This fuel cell diagnostic apparatus 50 measures the magnetic field in or around the fuel cell 1 while external voltage is being applied, and diagnoses the state of the fuel cell 1 from the measurement results. The following description will be based on the principle of the diagnostic method using the external voltage and the magnetic field generated by that external voltage (see FIG. 3).

Figure 3:
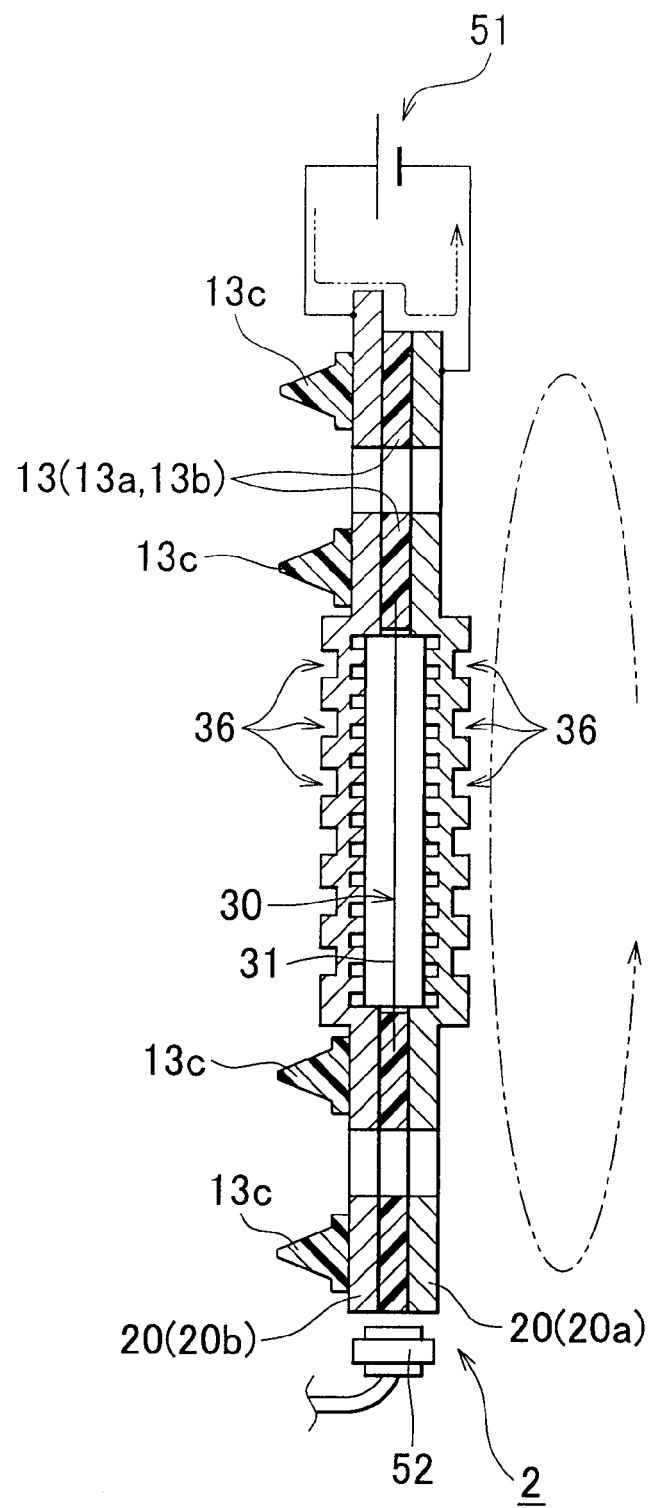
FIG. 3 is a view schematically showing a cross section of the power generating cell to illustrate the principle of the diagnostic method used by the fuel cell diagnostic apparatus.

When external voltage is applied to the separators 20 (20a and 20b) that form part of a single cell 2 such that current flows in the direction from the separator 20b to the separator 20a, a magnetic field (lines of magnetic force) is generated in and around the cell 2 (see the chain double-dashed line in FIG. 3). In this example embodiment, this magnetic field (lines of magnetic force) is measured using a magnetic line sensor 52 and the state of the cell 2 or the fuel cell 1 including the cell 2 is diagnosed based on this measurement result.

Here, examples of abnormal states that can occur in the cell 2 are as follows. That is, if a large amount of water produced in the cell 2 disrupts the flow or diffusion of the reaction gas (fuel gas or oxidizing gas), electrolysis of water occurs at the portion where a large amount of that water is present, which results in a current distribution that is different from the current distribution in other portions. Or, if a portion of a catalyst such as platinum (more specifically, a porous diffusion layer of carbon, for example, that carries the catalyst) which is adhered to the surface of the electrodes 32a and 32b that form part of the MEA 30 is lost through degradation, for example, current is not able to flow easily through that portion so the current distribution ends up being different than the current distribution at other portions. If such an abnormality occurs in the fuel cell 1, the fuel cell diagnostic apparatus 50 of the example embodiment measures the magnetic field that has been affected and distorted as a result, and can diagnose the state of the fuel cell 1 or the cell 2 that forms part of this fuel cell 1 based on the measurement result.

The timing at which the diagnostic is carried out using this kind of fuel cell diagnostic apparatus 50 is not particularly limited, but it is preferable that the diagnostic be carried out when it will not be affected by a transient state when power is being generated in the fuel cell. For example, performing the diagnostic after generating power in the fuel cell (i.e., after the fuel cell has stopped operating) enables the fuel cell 1 to be diagnosed without the transient state when power is being generated in the fuel cell from affecting the diagnosis. According to the fuel cell diagnostic apparatus 50 which applies voltage externally to generate a magnetic field, measures this magnetic field, and then performs a diagnostic based on the measurement results in this way, a diagnostic is able to be performed even when no power is being generated in the fuel cell.

Also, this fuel cell diagnostic apparatus 50 is able to diagnose the in-plane distribution of current in the power generating cell by measuring the magnetic field, as described above. As a result, if a large amount of produced water disturbs the flow or diffusion of reaction gas in the cell 2, as described above, for example, the distribution of water in the electrolyte membrane 31 can be diagnosed based on the diagnostic results of the in-plane distribution of that current. In particular, the fuel cell diagnostic apparatus 50 of this example embodiment can perform a diagnostic when no power is being generated, such as after power generation has finished, so a diagnosis of water distribution in the electrolyte membrane 31 after power generation, which was unable to be performed in the past, is now made possible.

The specific structure of this kind of fuel cell diagnostic apparatus 50 is not particularly limited. However, in this example embodiment, as means for applying the voltage externally, a cell monitor 51 for monitoring the voltage of each cell 2 is used (see FIG. 4). The cell monitor 51 is a device that is used to measure the power generating status by monitoring the voltage (cell voltage) of the cell 2. However, when provided in advance to measure the power generating status, the existing cell monitor 51 is also used in this example embodiment as voltage applying means, which obviates the need for other new external equipment. In addition, if a cell monitor 51 is provided for each of the plurality of stacked cells 2, the location of the abnormality, such as where the abnormality occurred in the stacking location, for example, is able to be more precisely identified because these cell monitors 51 can generate magnetic fields by applying voltage to each of the cells 2 (see FIG. 4). In this case, it is possible to detect, with respect to each cell 2, whether there is an abnormality by sequentially applying voltage from a terminal of the cell monitor 51 corresponding to each cell 2.

Figure 4:
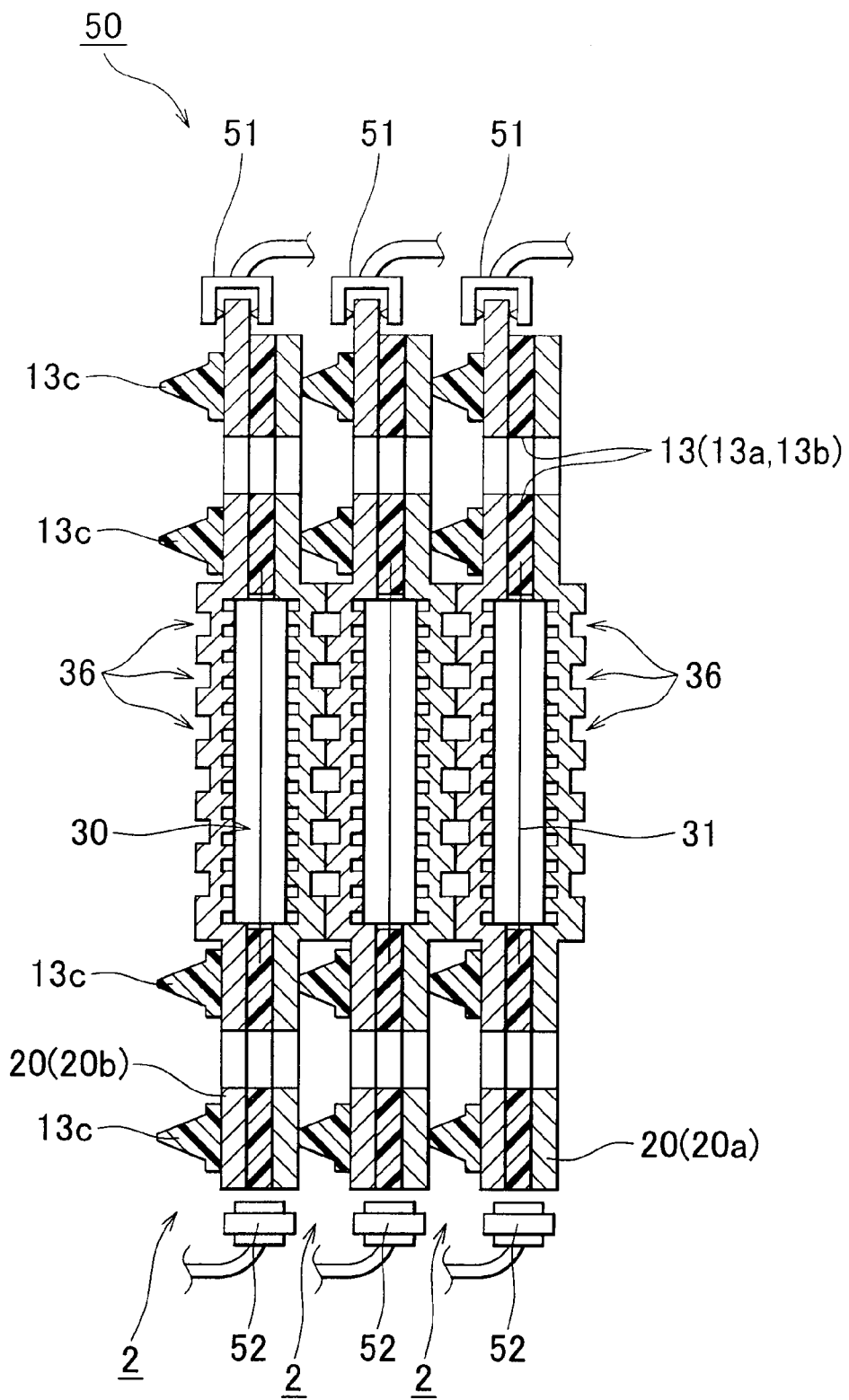
FIG. 4 is a view showing a fuel cell diagnostic apparatus according to one example embodiment of the invention, with a plurality of stacked cells being shown from the side.

Also, in this example embodiment, the magnetic line sensor 52 arranged around the cell stack body 3 is used as an example of means for measuring the magnetic field (lines of magnetic force) (see FIG. 4). Here, if a cell monitor 51 is provided for each of the plurality of stacked cells 2, a magnetic line sensor 52 is also preferable provided for each of the cells 2 as well (see FIG. 4). As a result, the magnetic field (lines of magnetic force) that can be generated in each cell 2 can be detected individually.

An example of a diagnostic routine carried out by the fuel cell diagnostic apparatus 50 of the structure described above will now be described with reference to a flowchart (see FIG. 5).

When performing a diagnostic, each separator 20 of the plurality of cells 2 is first shorted after the fuel cell 1 is finished generating power (i.e., after the fuel cell 1 has stopped operating) (step S1). When a cell monitor 51 is provided for each cell 2, the separators 20 of the cells 2 can be shorted using, for example, a substrate circuit, not shown, provided in each cell monitor 51. Incidentally, in order to avoid excessive current from instantaneously flowing during the short, the separators 20 are preferably shorted after, for example, the cells 2 are operated with an air stoichiometry ratio of normal or less and the potential difference between the positive and negative poles has been sufficiently reduced.

Next, external voltage is applied to the fuel cell 1 using the cell monitors 51 (step S2). In this example embodiment, for example, voltage is applied sequentially from the terminal of each cell monitor 51 provided for each cell 2.

Continuing on, the magnetic line sensor 52 then measures the magnetic field (lines of magnetic force) generated by the applied voltage (step S3). If there is an abnormal cell 2 in the fuel cell 1, this magnetic field (lines of magnetic force) will be distorted as a result. The abnormal cell 2 can thus be detected by measuring this distortion. As a result, the fuel cell 1 can be diagnosed from the detection results (step S4).

As described thus far, the fuel cell diagnostic apparatus 50 of this example embodiment can effectively diagnose the fuel cell 1. That is, until now, with only a cell monitor (voltage sensor), the in-plane power generating distribution of an electrode was unable to be measured because it monitors the average voltage of the overall cell. Even if an abnormality occurs in a portion of the cells, it may not be able to be detected, and with only a magnetic line sensor, the cell adjacent to the abnormal cell may also be erroneously detected as being abnormal. With this example embodiment, however, voltage is actively applied externally and an abnormal cell can more accurately be detected based on the measurement results of the magnetic field (lines of magnetic force) generated by that applied voltage.

Furthermore, when a cell monitor 51 is provided for each cell 2, a magnetic field can be generated for each cell 2 by applying voltage to each cell 2 using these cell monitors 51. As a result, it is also possible to more precisely identify the location of the abnormality, such as where the abnormality occurred in the stacking location, for example.

Also, because this fuel cell diagnostic apparatus 50 generates a magnetic field by applying voltage externally and performs a diagnostic based on the measurement results of this magnetic field, as described above, a diagnostic can be performed even when the fuel cell 1 is not generating power such as after power generation (i.e., after the fuel cell 1 has stopped operating). Therefore, if a large amount of produced water is present in the cell 2, for example, the distribution of the water in the electrolyte membrane 31 after power generation can be diagnosed based on the diagnostic results of the in-plane distribution of the current. Thus, a diagnostic after power generation, which was not possible before, is now possible.

Moreover, in this example embodiment which uses the cell monitors 51, the cell monitors 51 are used as voltage monitors when power is being generated normally. When power is not being generated, these cell monitors 51 can be used as means for applying power. As a result, the number of parts is able to be reduced and the circuit configuration is able to be simplified.

In addition, the fuel cell diagnostic apparatus 50 of this example embodiment can also reactivate the cells 2 while a diagnostic is being performed. That is, as power continues to be generated in the fuel cell 1, oxides accumulate on the surface of the electrode catalyst, which gradually reduces the power generating performance (output). With this example embodiment, however, when magnetic fields (lines of magnetic force) are generated in the cells 2 by applying voltage externally, the separators 20 are shorted and a reduction reaction is induced, thus making it possible to reactivate the catalyst surface at the same time an abnormality detection is performed with respect to the cells 2.

Incidentally, the foregoing example embodiment is simply a preferred example embodiment of the invention. The invention is in no way limited to this example embodiment. To the contrary, various modifications may be made without departing from the scope of the invention. For example, in the foregoing example embodiment, a case is described in which the cell monitors 51 provided for each of a plurality of stacked cells 2 are used as voltage applying means, but this is merely a preferred example. The invention may also be applied to a case in which the number of cell monitors 51 is less than the number of stacked cells. That is, in view of detecting the power generating status by measuring the magnetic fields (lines of magnetic force) of the power generating cells 2, it can be said that having more cell monitors 51 is better (i.e., it is preferable to have the number of cell monitors 51 be closer to the number of stacked cells). However, some structures may also have fewer cell monitors to reduce size and cost. Even in these cases, it is still possible to apply voltage externally using the cell monitors 51 and generate a magnetic field in or around the fuel cell 1. Accordingly, distortion of the magnetic field can be measured by the magnetic line sensor 52 and the fuel cell can then of course be diagnosed based on those results. For example, a diagnostic method is also possible in which, when the number of cell monitors 51 is less than the number of stacked cells, a plurality of adjacent cells 2 is considered as a block and a magnetic field (lines of magnetic force) is generated for each block using these cell monitors 51.

Similarly, the invention can also be applied to a case in which the number of magnetic line sensors 52 is less than the number of stacked cells. For example, a diagnostic method is also possible in which a plurality of adjacent cells 2 is considered as a block and the magnetic field (lines of magnetic force) is measured for each block using these magnetic line sensors 52.

In this way, a pair of sensors consisting of a cell monitor 51 and a magnetic line sensor 52 does not have to be provided for all of the cells 2. In an extreme case, even if there is only one pair of these sensors, it is still possible to measure the magnetic field while moving the single pair of sensors in the cell stacking direction, and perform a diagnostic based on this measurement. Alternatively, it is also possible to arrange a plurality of pairs of sensors, which is less than the number of stacked cells, in positions aligned with specific portions where detection is desired (such as portions where abnormalities may likely occur), thereby ultimately reducing the number of sensors.

Moreover, in view of making the pair of sensors more compact, the magnetic line sensor 52 may be integrated with the terminal portion of the cell monitor 51, for example.

Incidentally, in the foregoing example embodiment, the cell monitor 51 is given as a preferable example of external voltage applying means, which obviates the need for external equipment. However, this does not prevent a device or equipment other than the cell monitor 51 from being used as the external voltage applying means. That is, it is also possible to of course apply voltage externally using another device or other equipment.

According to the example embodiment of the invention, the distribution of water in the electrolyte membrane can be diagnosed even when power is not being generated such as after power generation.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A fuel cell diagnostic apparatus that diagnoses a fuel cell in which a plurality of power generating cells are stacked together, comprising:
a voltage applying device that applies an external voltage to the fuel cell;
a magnetic field measuring device that measures a magnetic field in or around the fuel cell when the external voltage is being applied; and
a diagnostic device that detects the presence of an abnormal cell from the measurement results of the magnetic field.

2. The fuel cell diagnostic apparatus according to claim 1, wherein the voltage applying device generates a magnetic field in or around the fuel cell by applying external voltage from a cell monitor that measures the power generating status of the fuel cell by measuring the cell voltage of the power generating cells.

3. The fuel cell diagnostic apparatus according to claim 1, wherein the diagnostic device diagnoses an in-plane distribution of current in the power generating cells.

4. The fuel cell diagnostic apparatus according to claim 3, wherein the diagnostic device diagnoses a distribution of water in an electrolyte membrane of the fuel cell based on the diagnostic results of the in-plane distribution of current in the power generating cells.

5. The fuel cell diagnostic apparatus according to claim 1, wherein the voltage applying device applies external voltage to the fuel cell while separators of the plurality of power generating cells are shorted.

6. The fuel cell diagnostic apparatus according to claim 1, wherein the state of the fuel cell is diagnosed when power is not being generated in the fuel cell.

7. A fuel cell diagnostic method for a fuel cell in which a plurality of power generating cells are stacked together, comprising:
applying an external voltage to the fuel cell;
measuring a magnetic field in or around the fuel cell when the external voltage is being applied; and
detecting the presence of an abnormal cell from the measurement results of the magnetic field.

8. The diagnostic method for a fuel cell according to claim 7, wherein external voltage is applied to the fuel cell from a cell monitor that measures the power generating status of the fuel cell by measuring the cell voltage of the power generating cells.

9. The diagnostic method for a fuel cell according to claim 7, wherein an in-plane distribution of current in the power generating cells is diagnosed.

10. The diagnostic method for a fuel cell according to claim 9, wherein a distribution of water in an electrolyte membrane of the fuel cell is diagnosed based on the diagnostic results of the in-plane distribution of current in the power generating cells.

11. The diagnostic method for a fuel cell according to claim 7, wherein the applying an external voltage occurs while separators of the plurality of power generating cells are shorted.

12. The diagnostic method for a fuel cell according to claim 7, wherein the state of the fuel cell is diagnosed when power is not being generated in the fuel cell.

13. A fuel cell diagnostic apparatus that diagnoses a fuel cell in which a plurality of power generating cells are stacked together, comprising:
voltage applying means for applying an external voltage to the fuel cell;
magnetic field measuring means for measuring a magnetic field in or around the fuel cell when the external voltage is being applied; and
diagnosing means for detecting the presence of an abnormal cell from the measurement results of the magnetic field.

* * * * *